United States Patent [19]
Arai et al.

[11] Patent Number: 5,668,806
[45] Date of Patent: Sep. 16, 1997

[54] SPREAD SPECTRUM COMMUNICATION APPARATUS

[75] Inventors: Yasuyuki Arai, Yokosuka; Tetsuo Kanda, Yokohama, both of Japan

[73] Assignee: Canon Kabushiki Kaisha, Tokyo, Japan

[21] Appl. No.: 501,144

[22] Filed: Jul. 11, 1995

[30] Foreign Application Priority Data

Jul. 21, 1994 [JP] Japan .................................. 6-191140
Jun. 20, 1995 [JP] Japan .................................. 7-176773

[51] Int. Cl.$^6$ .......................................... H04J 13/00
[52] U.S. Cl. ...................... 370/342; 370/441; 370/479
[58] Field of Search ........................ 370/18, 335, 342, 370/441, 479; 375/200, 205, 207

[56] References Cited

U.S. PATENT DOCUMENTS 4,701,905 10/1987 Un et al. ................................ 370/18
5,218,619 6/1993 Dent ...................................... 375/205
5,390,167 2/1995 Inatsu et al. ........................... 370/18

Primary Examiner—Melvin Marcelo
Attorney, Agent, or Firm—Fitzpatrick, Cella, Harper & Scinto

[57] ABSTRACT

A communication apparatus for code-division multiplexing a transmission path includes a spread spectrum transmitter and receiver. The spread spectrum transmitter includes a code-division multiple signal generator, a non-linear code-division multiple signal converter, and a transmitter for transmitting the converted signal. The code-division multiple signal is converted so that the transmitted signal has a plurality of amplitude values. The spread spectrum receiver includes a code-division multiple signal receiver, a non-linear converter for converting an amplitude of the received code-division multiple signal, and a de-spreader for de-spreading the non-linearly converted code-division multiple signal.

28 Claims, 14 Drawing Sheets

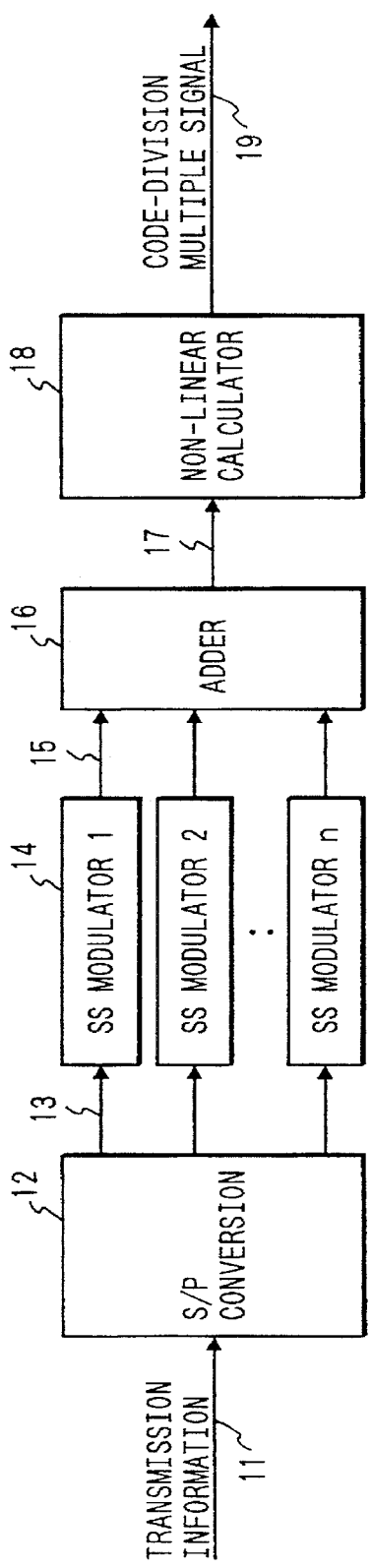
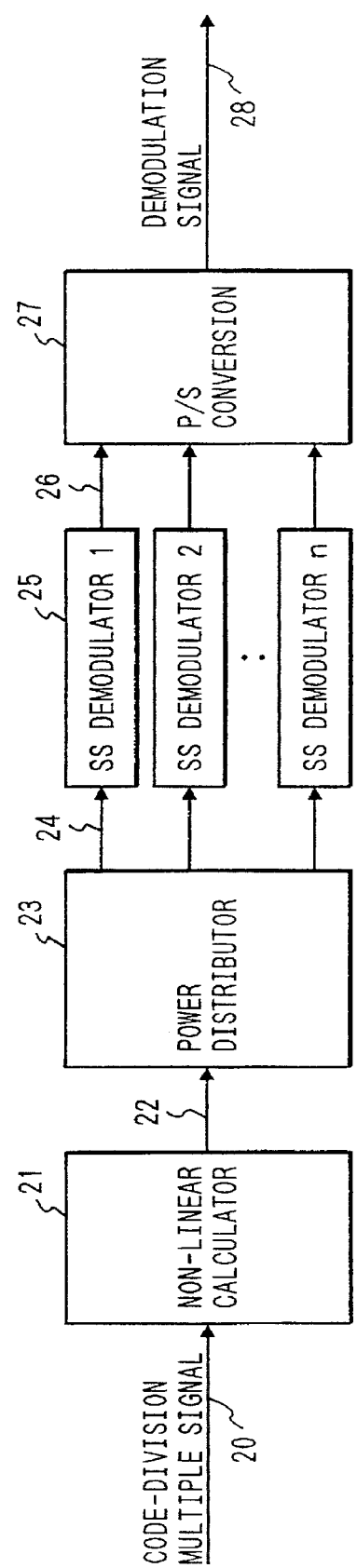

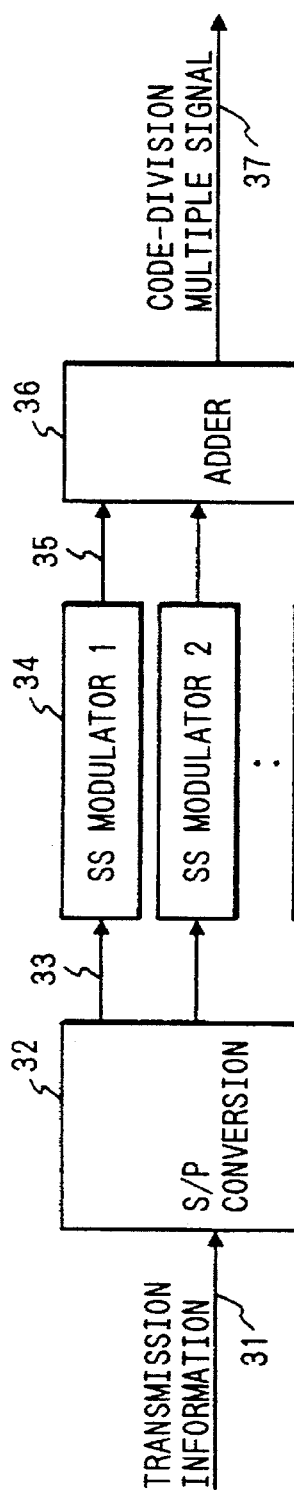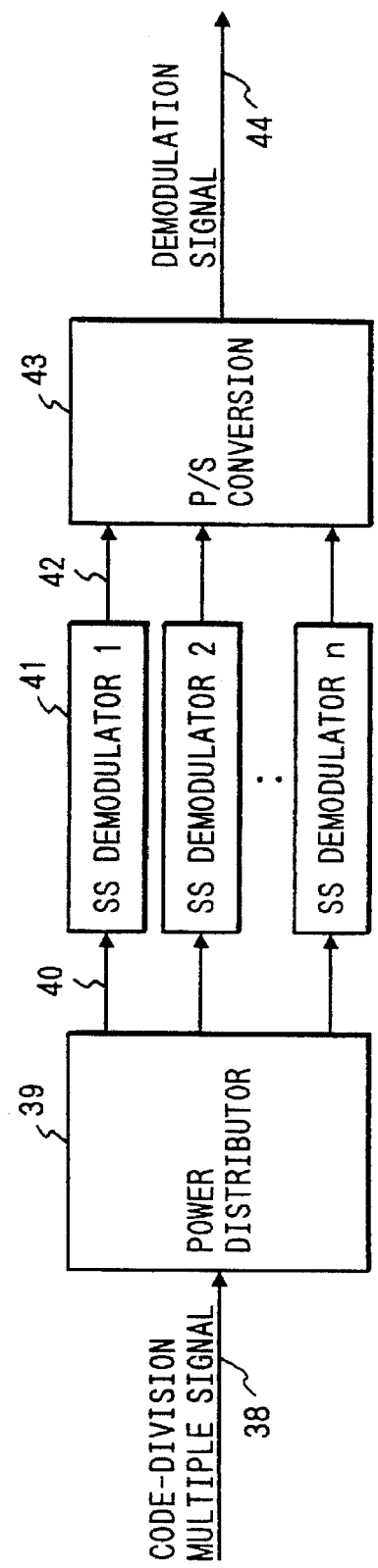

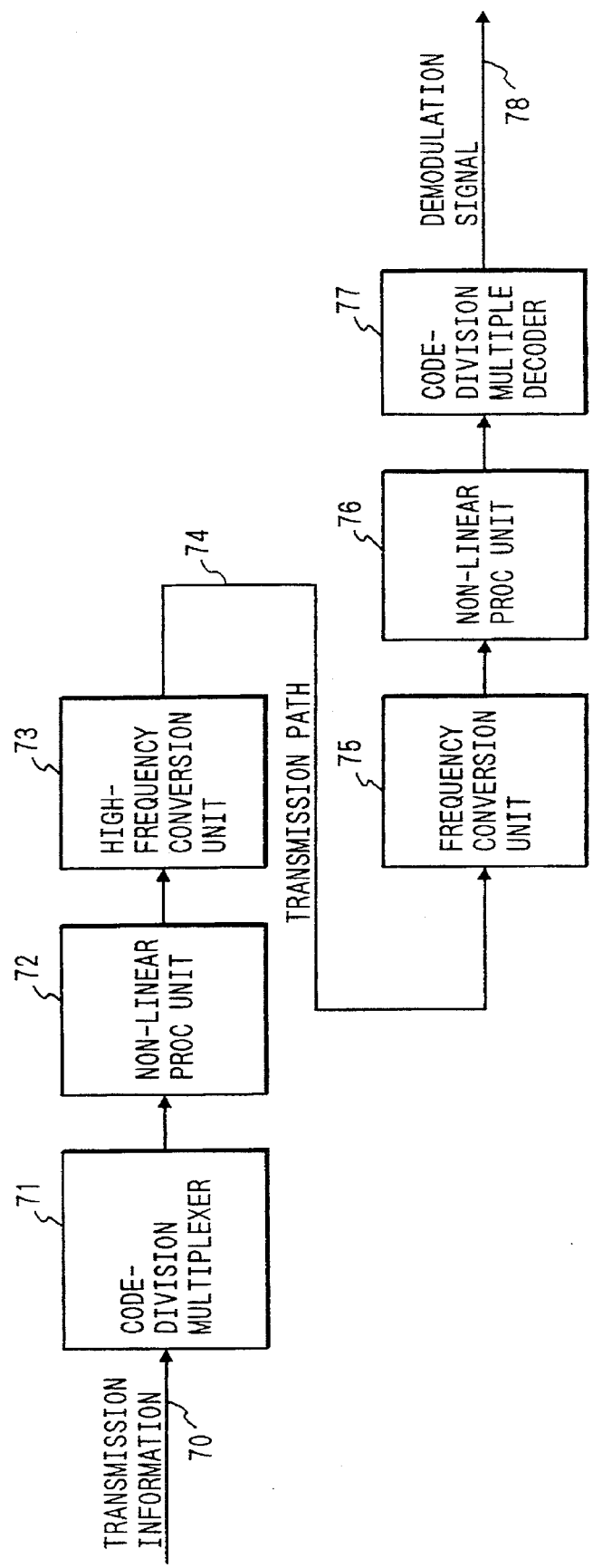

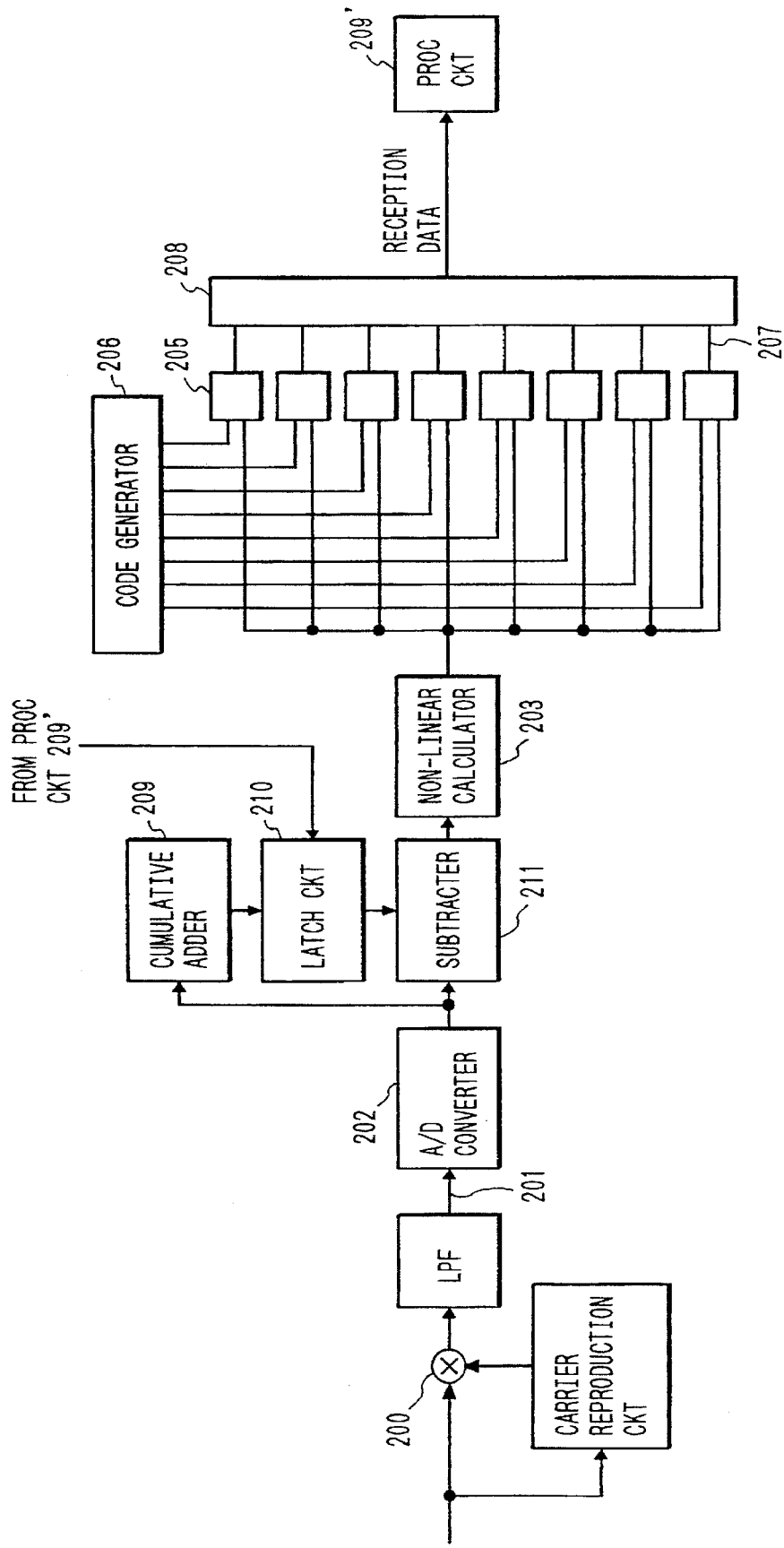

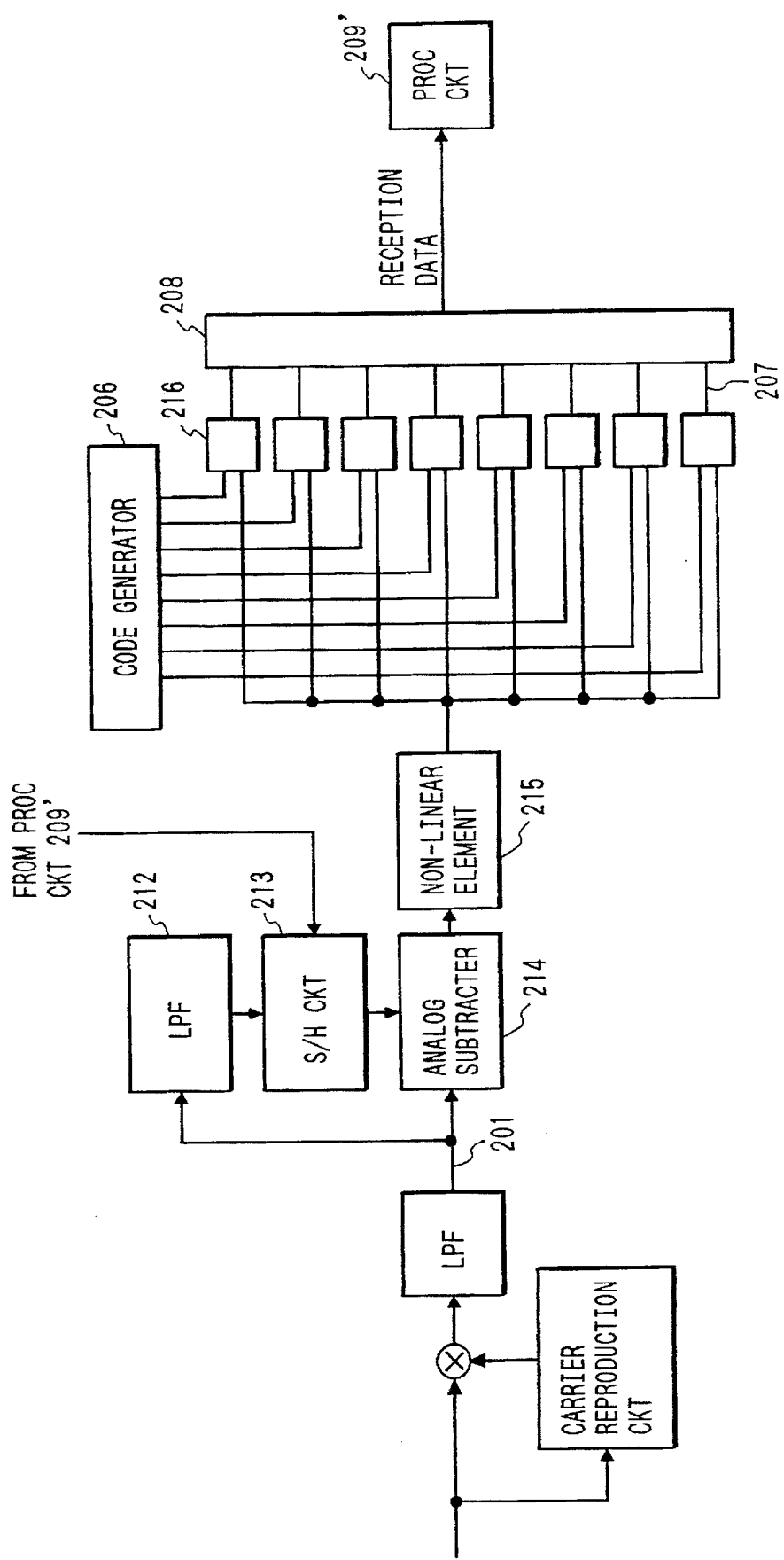

5,668,806

SPREAD SPECTRUM COMMUNICATION APPARATUS

BACKGROUND OF THE INVENTION

1. Field of the Invention

The present invention relates to a communication apparatus for code-division multiplexing a transmission path by using a spread spectrum communication system in order to increase the transmission capacity.

2. Related Background Art

Hitherto, in a spread spectrum (SS) communication system, a code-division multiple communication system which increases the information transmission speed by multiplexing codes utilizing plural spread codes having low mutual correlative characteristics has been considered. This system has been remarked as one method for conducting a high-speed information transmission within a limited band.

FIGS. 3A and 3B are block diagrams showing a structural example of a code-division multiple communication apparatus in such a conventional spread spectrum communication system. FIG. 3A indicates a transmission unit and FIG. 3B indicates a reception unit.

First, transmission information 31 is converted into n parallel data 33 (1 to n) by an S/P (serial-parallel) converter 32 in the transmission unit shown in FIG. 3A. Each of the parallel data 33 (1 to n) is modulated by each of different spread codes of an SS modulators 34 (1 to n). N spectrum spread SS signals 35 (1 to n) are added by an adder 36 to become a code-division multiple signal 37.

In the reception unit shown in FIG. 3B, a code-division multiple signal 38 is distributed into n code-division multiple signals 40 (1 to n) by a power distributor 39. The distributed multiple signals 40 (1 to n) are inversely spread by SS demodulators 41 (1 to n) to be demodulated to n data 42 (1 to n). The demodulated data 42 (1 to n) are converted into serial data by a P/S (parallel-serial) converter 43 to obtain a demodulation signal 44.

In this way, a high-speed transmission can be achieved while an occupied bandwidth is fixed by converting the transmission information into the parallel data 33 (1 to n) and utilizing a code-division multiple system.

In the transmission unit, the spectrum spread signals 35 (1 to n) are synthesized by utilizing a linear adder 36 for code-division multiplexing. In case where the transmission information 31 is converted into the n parallel data 33 (1 to n), the value of the code-division multiple signal 37 becomes available within the range of 0 to n. In a reception unit, the SS demodulators 41 (1 to n) which enable to execute an inverse spread and treat the value of 0 to n as inputs are required.

However, the value of 0 to n which appear in a code-division multiple signal are not uniformly distributed and it is not efficient to maintain a dynamic-range for an entire area of 0 to n. Also, since useless portions are required on circuit arrangement, simplification or mintaturization of a communication apparatus is prevented.

SUMMARY OF THE INVENTION

An object of the present invention is to improve the code-division multiple communication utilizing a spread spectrum communication system.

Another object of the present invention is to miniaturize or simplify a code-division multiple communication apparatus which utilizes a spread spectrum communication system.

Still another object of the present invention is to improve a reliability in the code-division multiple communication utilizing a spread spectrum communication system.

The above and other objects and features of the present invention will become apparent from the following description and the appended claims.

BRIEF DESCRIPTION OF THE DRAWINGS

FIGS. 1A and 1B are block diagrams showing first and second embodiments of the present invention;

FIGS. 3A and 3B are block diagrams showing a prior art;

FIG. 6 is a block diagram showing a seventh embodiment of the present invention;

FIGS. 12A and 12B are block diagrams showing the constitution of ninth and tenth embodiments of the present invention.

DETAILED DESCRIPTION OF THE PREFERRED EMBODIMENTS

Figure 2A:
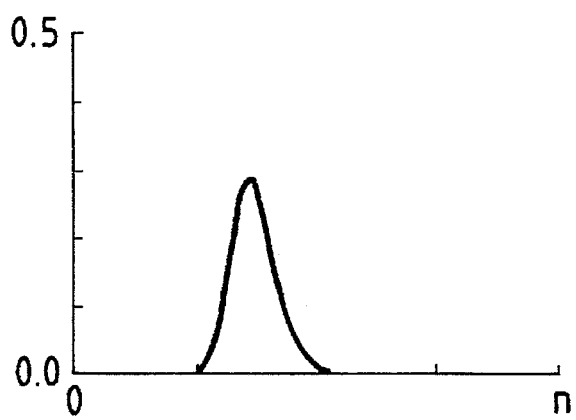
FIGS. 2A to 2C are wave-form views showing a generating distribution example and a non-linear characteristic example of a code-division multiple signal in the above first and second embodiments.

FIG. 1A is a block diagram showing the structure of a transmission unit of a code-division multiple communication apparatus in a first embodiment of the present invention.

First, transmission information 11 is converted into n parallel signals 13 (1 to n) by an S/P (serial-parallel) converter 12. It should be noted that, if the transmission information is originally formed by parallel signals, an S/P converter is not required. The signals 13 (1 to n) are input to SS modulators t4 (1 to n) in which signals are spread spectrum modulated by being multiplied by each of spread codes to become SS signals 15 (1 to n). Those SS signals 15 (1 to n) are added by an adder 16 to become a code-division multiple signal 17 holding the amplitude value of 0 to n.

Figure 2B:
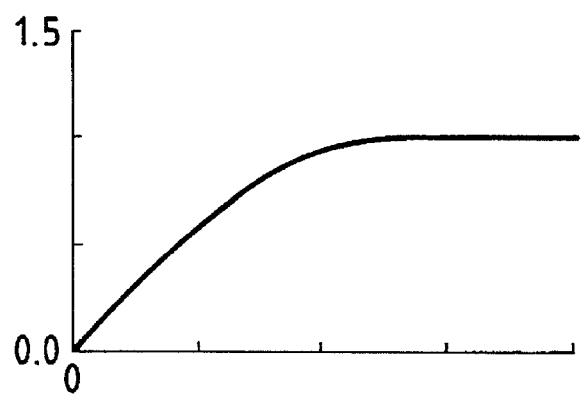

The amplitude value of the code-division multiple signal 17 is not uniformly distributed, and the maximum value of an amplitude which appears in one cycle of the code becomes, for example, such a distribution as shown in FIG. 2A. For the signal value having such a generating probability distribution, the amplitude of the code-division multiple signal 17 is limited by using a non-linear calculator 18 having, for example, such a non-linear characteristic as shown in FIG. 2B. It should be noted that FIG. 2B shows an input/output characteristic of the non-linear calculator 18.

Accordingly, the large value of an amplitude with the low code generating probability is compressed to limit the amplitude value. A code-division multiple signal 19 is modulated to the carrier frequency and is transmitted. If this non-linearly calculated code-division multiple signal 19 is demodulated by a reception apparatus which does not execute a previous process, the data with a large amplitude value loses the little information, however, since the SS communication can logically expect the process gain, a fault ratio of the demodulation signal is very little influenced. The non-linear characteristic shown in FIG. 2B can be properly changed in accordance with the generating probability of the amplitude value of a code-division multiple signal.

FIG. 1B is a block diagram showing the structure of a reception unit of a code-division multiple communication apparatus in a second embodiment of the present invention.

First, the amplitude of a code-division multiple signal 20 is limited by, for example, a non-linear calculator 21 having the non-linear characteristic shown in FIG. 2B. The non-linear calculator 21 outputs an input signal to which the coefficient shown in FIG. 2B is multiplied. A code-division multiple signal 22 of which amplitude is limited is distributed to n code-division multiple signals 24 (1 to n) by a power distributor 23. Each of the signals 24 is inversely spread by being multiplied by each of spread codes by SS demodulators 25 (1 to n) to become demodulation data 26 (1 to n) for each channel and further to become a demodulation signal 28 by a P/S (parallel-serial) converter 27. It should be noted that if the demodulation signal is output as a parallel signal, the P/S converter 27 is not required.

Figure 2C:
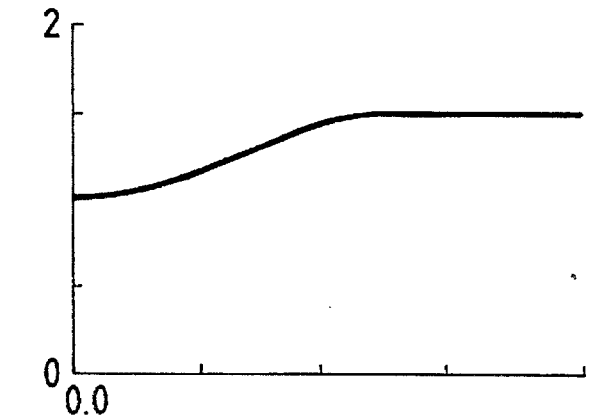

Here, the non-linear characteristic shown in FIG. 2B is utilized, for example, if the amplitude is already limited as in a first embodiment, the amplitude can be developed by using a non-linear calculator having the non-linear characteristic shown in FIG. 2C.

Figure 4A:
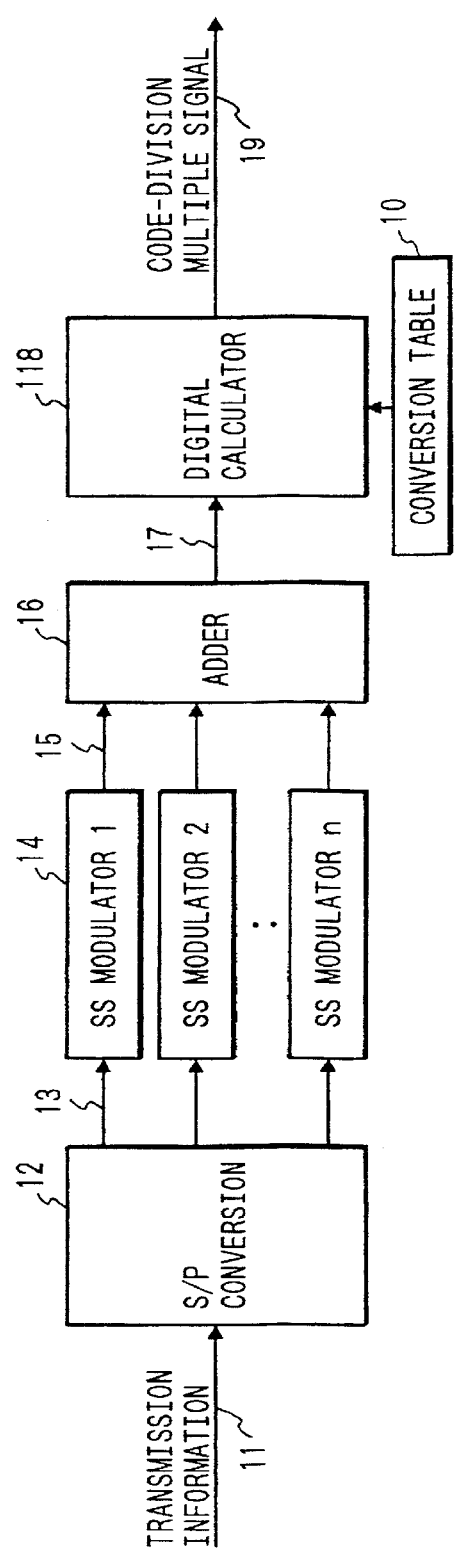
FIGS. 4A and 4B are block diagrams showing third and fourth embodiments of the present invention.

FIG. 4A is a block diagram showing the structure of a transmission unit of a code-division multiple communication apparatus in a third embodiment of the present invention.

In FIG. 4A, the common structural devices as those in FIG. 1A are indicated by the same reference numerals.

Figure 7A:
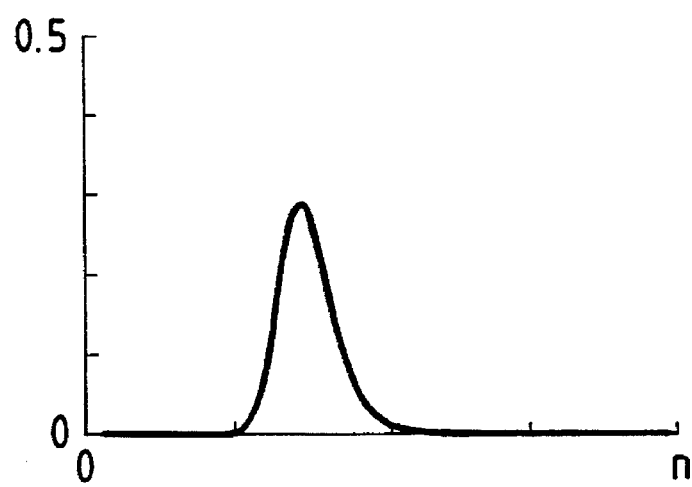
FIG. 7A is a wave-form view showing a generating distribution example of a code-division multiple signal in third and fifth embodiments of the present invention.
Figure 7B:
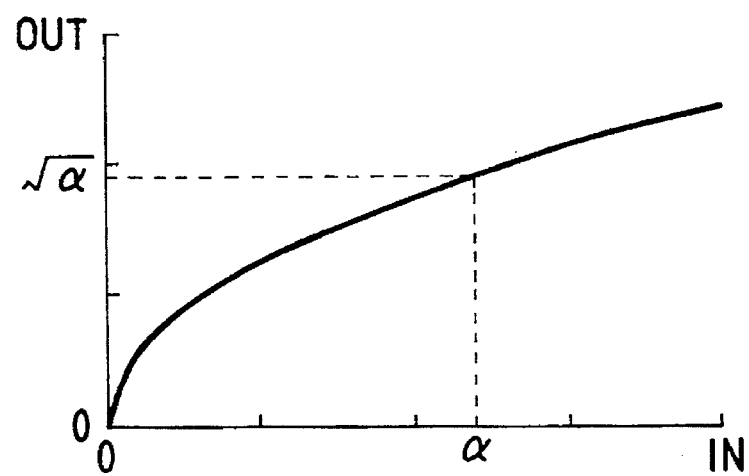
FIG. 7B is a wave-form view showing a non-linear characteristic example in third, fifth and seventh embodiments of the present invention.

In this embodiment, for example, against a signal 17 having the generating probability distribution shown in FIG. 7A, an output limits the amplitude of the code-division multiple signal 17 in a digital calculator 118 by using a conversion table 10 having the non-linear characteristic for square rooting an input as shown in FIG. 7B. It should be noted that square root map is not always strictly required by executing the quantization, in a conversion table 10.

In this embodiment, since the conversion table is provided, the non-linear characteristic can be easily varied.

Figure 8A:
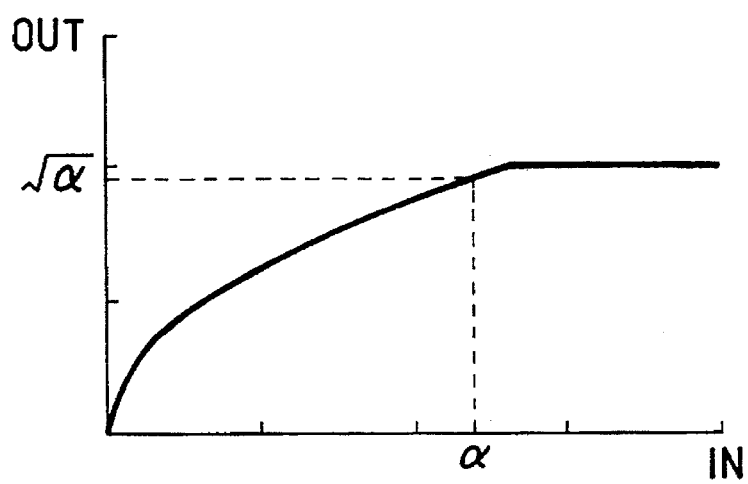
FIGS. 8A and 8B are wave-form views showing non-linear characteristic examples in third and fifth embodiments of the present invention.
Figure 8B:
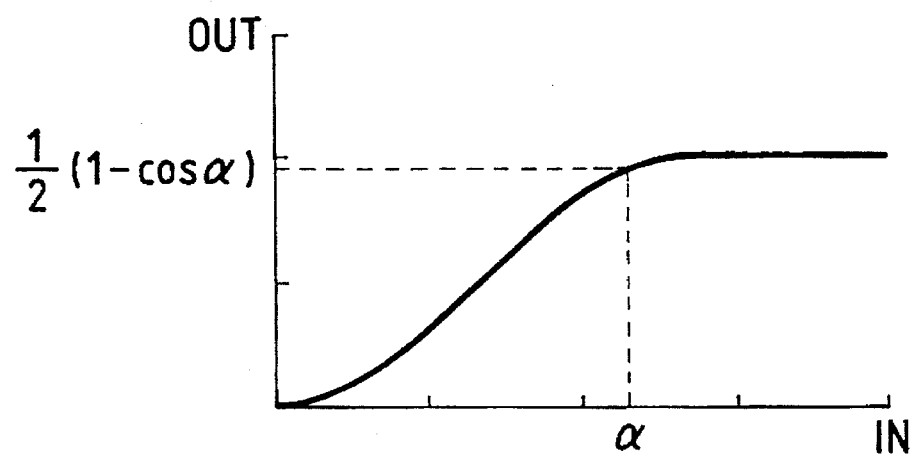

This non-linear characteristic can also select a non-linear characteristic (FIG. 8A) limiting the square root characteristic with a certain input or a raised-cosine type characteristic (FIG. 8B) under the consideration of the generating probability of the amplitude value of a code-division multiple signal, the capacity of a system or the like.

Figure 4B:
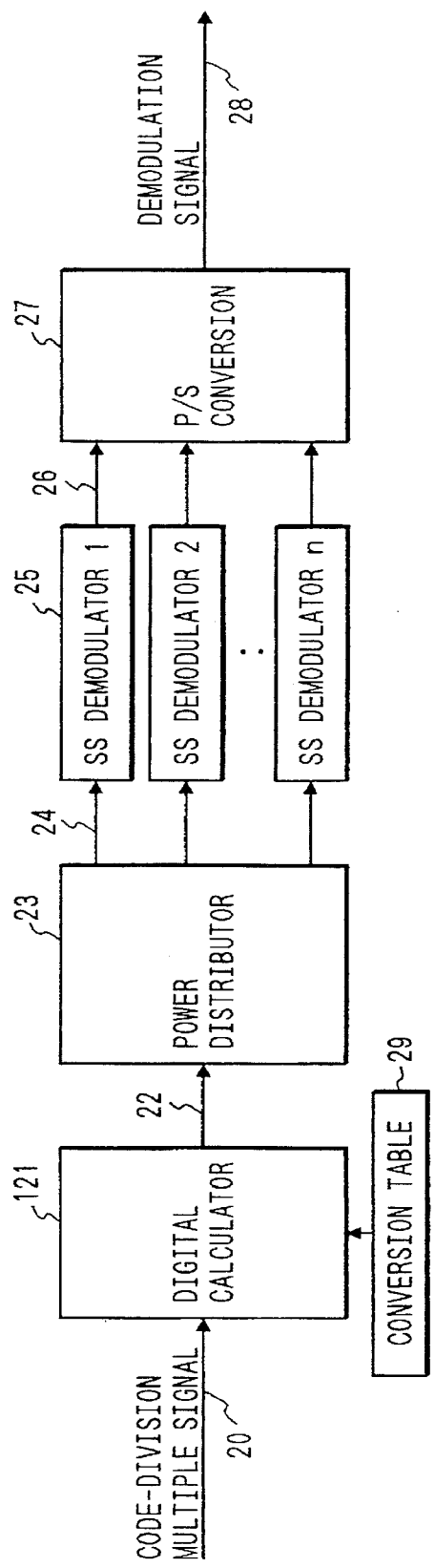

FIG. 4B is a block diagram showing the structure of a reception unit of a code-division multiple communication apparatus in a fourth embodiment of the present invention.

In FIG. 4B, the common structural devices as those in FIG. 1A are indicated by the same reference numerals.

Figure 9A:
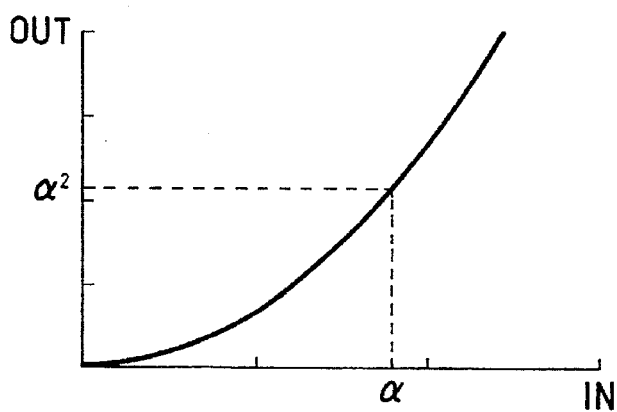
FIGS. 9A to 9C are wave-form views showing non-linear characteristic examples in fourth, sixth and seventh embodiments of the present invention.

The amplitude of a digital code-division multiple signal 20 is developed by using, for example, a conversion table 29 having the non-linear square characteristic as shown in FIG. 9A by a digital calculator 121. A code-division multiple signal 22 of which amplitude is developed is distributed to n code-division multiple signals 24 (1 to n) by a power distributor 23. It should be noted that square characteristic map is not always strictly required by executing the quantization in the conversion table 29. It is effective to develop the amplitude in case where the amplitude is limited in a transmission unit or the code-division multiple signal 20 is distorted by the characteristic of a transmission path or the like. Also, the non-linear characteristic can be easily changed because a conversion table is provided.

Figure 9B:
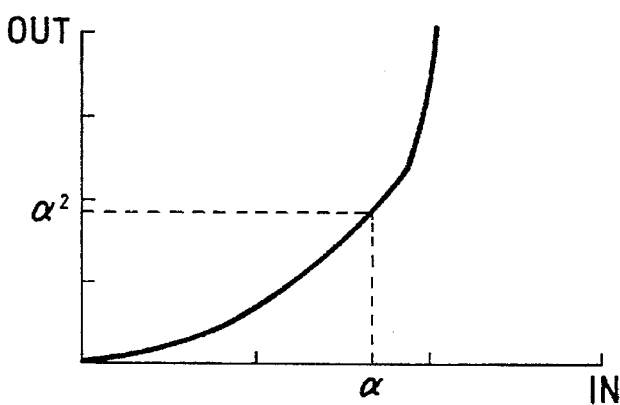
Figure 9C:
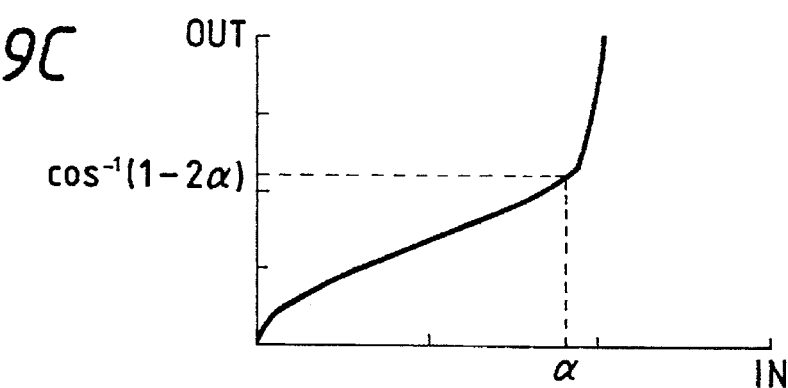

Here, the non-linear characteristic having the square characteristic shown in FIG. 9A is utilized however, it is also possible to develop the amplitude by using, for example, a conversion table having the non-linear characteristic synthesized with the square characteristic and the primary characteristic shown in FIG. 9B or a conversion table having the raised-cosine type inverse characteristic shown in FIG. 9C.

Figure 5A:
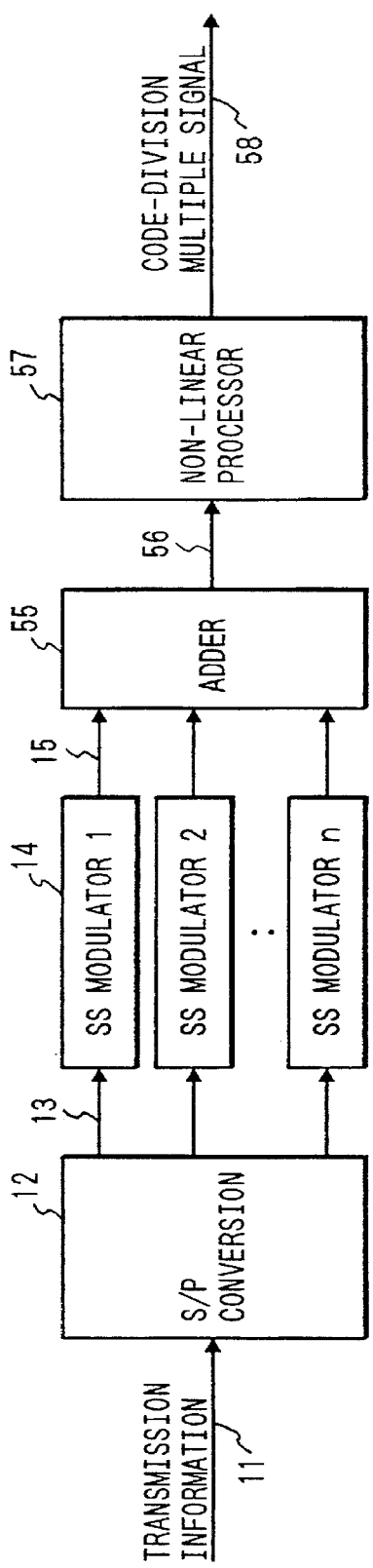
FIG. 5A and 5B are block diagrams showing fifth and sixth embodiments of the present invention.

FIG. 5A is a block diagram showing the structure of a transmission unit of a code-division multiple communication apparatus in a fifth embodiment of the present invention.

In FIG. 5A, the common structural devices as those in FIG. 1A are indicated by the same reference numerals.

In this embodiment, SS signals 15 (1 to n) in a base band becomes an analog code-division multiple signal 56 having the amplitude value of 0 to n, after being added and D/A (digital/analog) converted by an adder 55. For example, against the signal 56 having the generating probability distribution as shown in FIG. 7A, an output limits the amplitude of the code-division multiple signal 56 in a non-linear processor 57 having the non-linear characteristic for square rooting an input as shown in FIG. 7B.

The non-linear characteristic can also select a non-linear characteristic (FIG. 8A) limiting the square root characteristic with a certain input or the raised-cosine type characteristic (FIG. 8B) under the consideration of the generating probability of the amplitude value of a code-division multiple signal, the capacity of a system or the like.

Figure 5B:
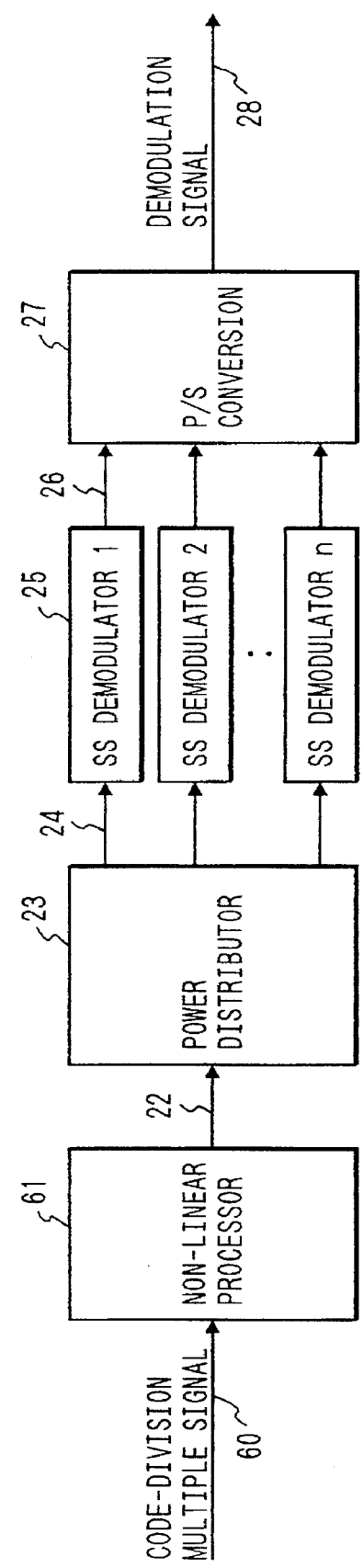

FIG. 5B is a block diagram showing the structure of a reception unit of a code-division multiple communication apparatus in a sixth embodiment of the present invention.

In FIG. 5B, the common structural devices as those in FIG. 1B are indicated by the same reference numerals.

In this embodiment, the amplitude of an analog code-division multiple signal 60 is developed and the signal 60 is A/D (analog/digital) converted by, for example, a non-linear processor 61 having the nonlinear square characteristic as shown in FIG. 9A. A code-division multiple signal 22 of which amplitude is developed and which is A/D converted is distributed to n code-division multiple signals 24 (1 to n) by a power distributor 23.

Here, the non-linear characteristic having the square characteristic shown in FIG. 9A is utilized, however, it is also possible to develop the amplitude by using, for example, a non-linear processor having the non-linear characteristic synthesized with the square characteristic and the primary characteristic shown in FIG. 9B or a non-linear processor having the raised-cosine type inverse characteristic shown in FIG. 9C.

FIG. 6 is a block diagram showing the structure of a transmission unit and a reception unit of a code-division multiple communication apparatus in a seventh embodiment of the present invention.

Transmission information 70 becomes a multiplexed SS signal by a code-division multiplexer 71 to be input to a non-linear process unit 72. The non-linear characteristic of a non-linear process unit 72 selects, for example, the square root characteristic as shown in FIG. 7B under the consideration of the generating probability distribution of the code-division multiple signal value, the dynamic range of a high-frequency conversion unit 73 or the band characteristic of a transmission path. The code-division multiple signal of which amplitude is limited in a non-linear process unit 72 is converted to the desired carrier frequency in a high-frequency conversion unit and is transmitted through a transmission path 74.

In a frequency conversion unit 75, the signal transmitted through a transmission path 74 is converted to the demoduatable frequency which can be demodulated by a demodulator. A non-linear process unit 76 develops the code-division multiple signal of which amplitude is limited by using, for example, the non-linear square characteristic having the non-linear characteristic and the inverse characteristic of a transmission unit as shown in FIG. 9A. The developed code-division multiple signal is demodulated by a code-division multiple decoder 77 to become a demodulation signal 78.

Like this, by executing the non-linear process to a code-division multiple signal in a transmission unit, limiting the amplitude and developing the code-division multiple signal with the non-linear characteristic having the inverse characteristic of a transmission unit in a reception unit, the analog portion can be operated in a linear area of the narrow dynamic range in a high-frequency conversion unit of a transmission unit, a transmission path and a frequency conversion unit of a reception unit. Therefore, a communication apparatus can be simplified and miniaturized without deteriorating the communication quality.

Figure 10A:
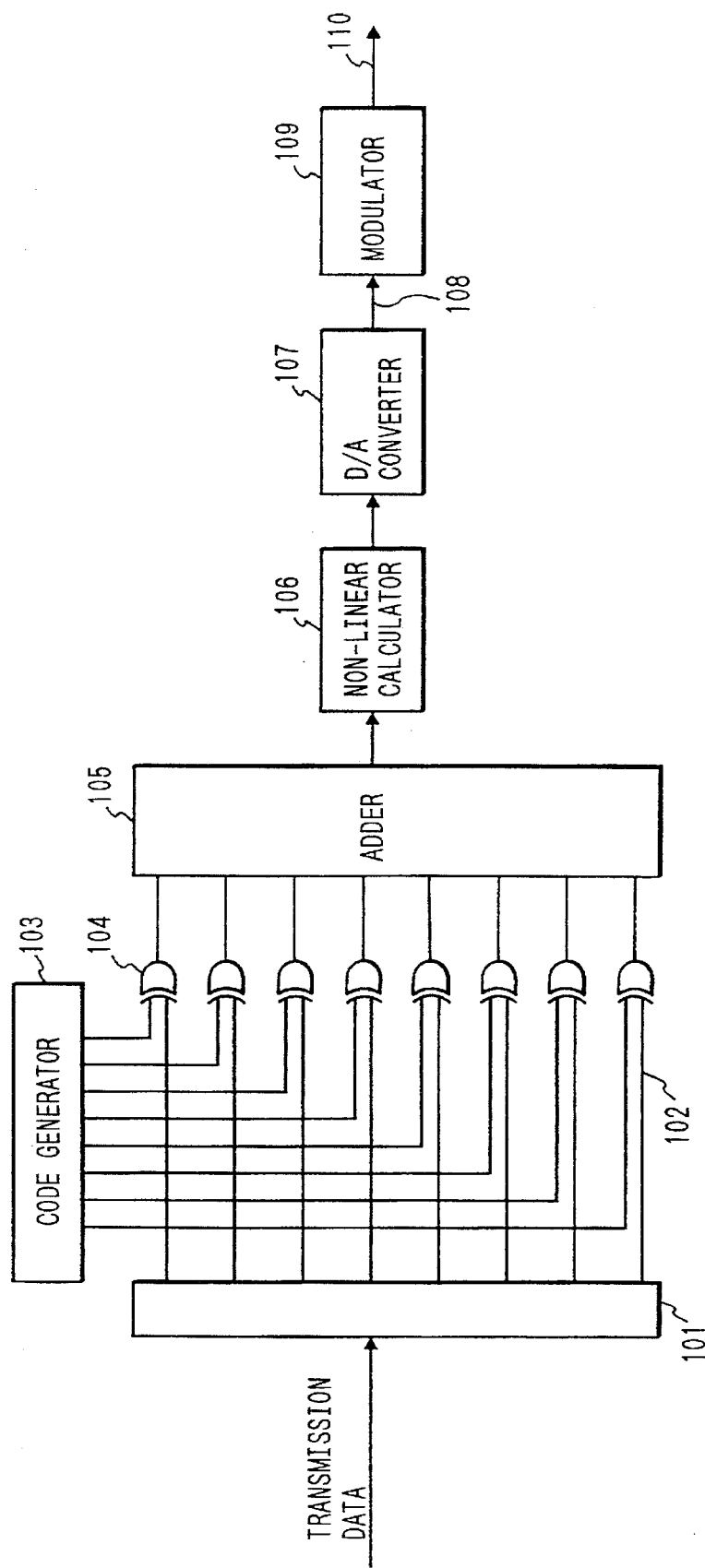
FIGS. 10A and 10B respectively indicate the structure of a transmitter and a wave-form showing a non-linear characteristic example in an eighth embodiment of the present invention.
Figure 11B:
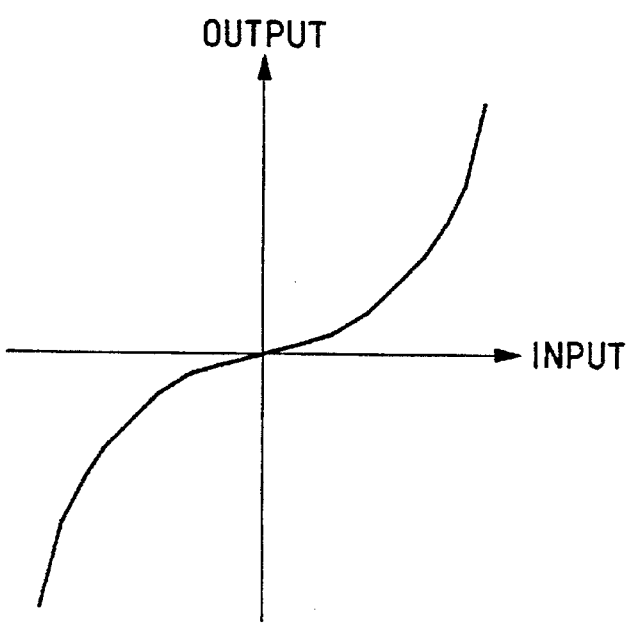
FIGS. 11A and 11B respectively indicate the structure of a receiver and a wave-form showing a non-linear characteristic example in an eighth embodiment of the present invention.
Figure 11A:
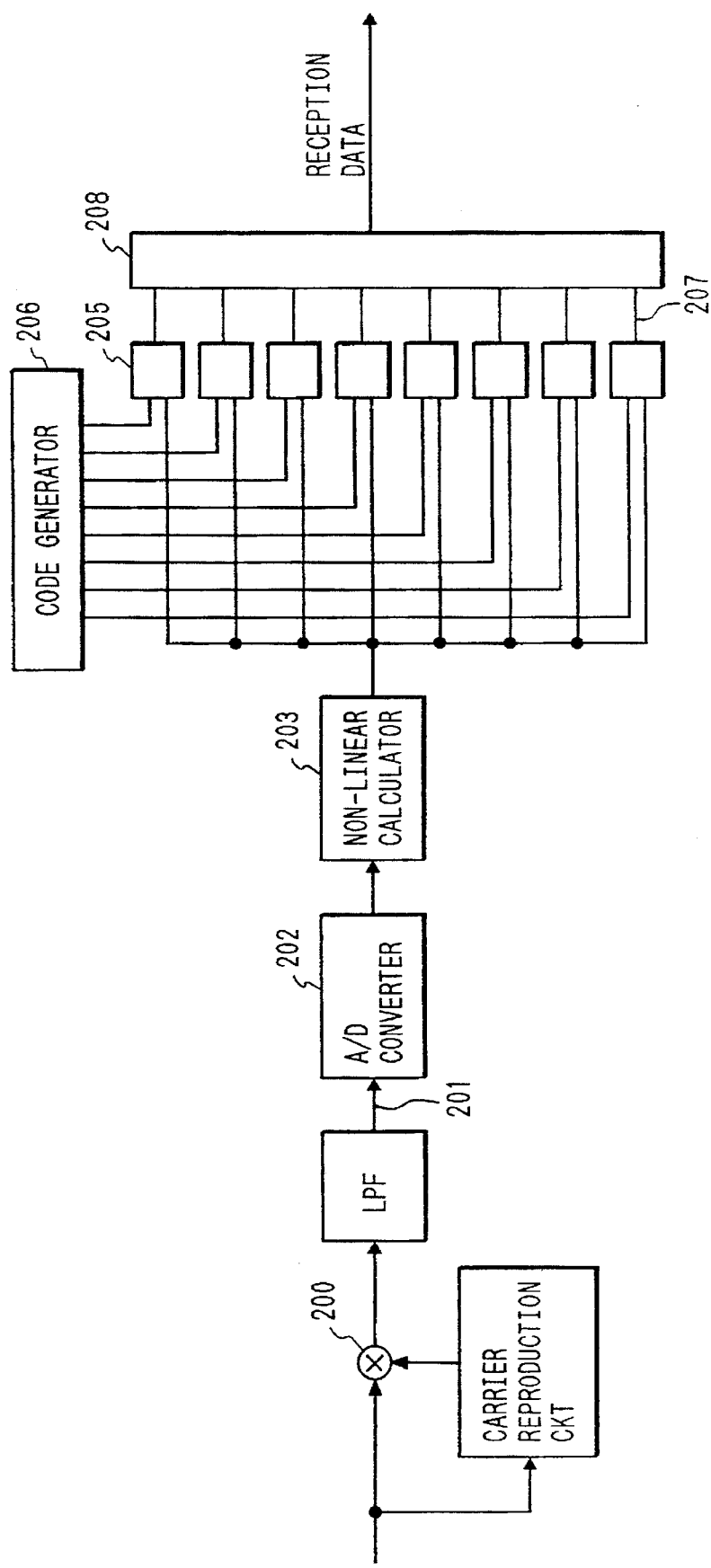

FIG. 10A is a block diagram showing a transmitter of a code-division multiple communication apparatus in a eighth embodiment utilizing a non-linear operation and FIG. 11A is a block diagram showing the structure of a receiver in said code-division multiple communication apparatus. In this embodiment, a phase modulation method is utilized as a modulation system and a synchronous demodulation method is utilized as a demodulation system.

Figure 10B:
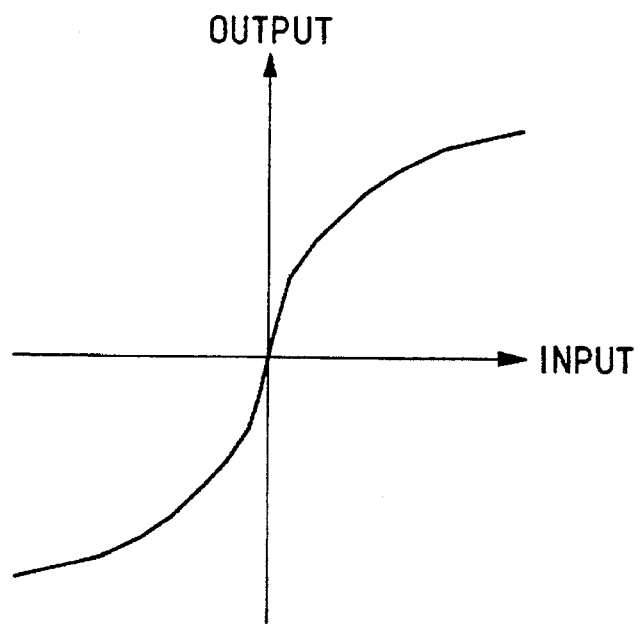

In FIG. 10A, the high speed transmission data is converted into low speed parallel data 102 (1 to n) by a serial-parallel converter 101. It should be noted that if the input data is originally parallel data, the converter 101 is not required. These parallel data are spectrum spread modulated by plural different spread codes generated from a code generator 103 and exclusive OR circuits 104 and are further added by an adder 105 to obtain the code-division multiple signal. The code-division multiple signal multiplexed in this way, of which amplitude is compressed by, for example, a non-linear calculator 106 having the non-linear input/output characteristic as shown in FIG. 10B, thereafter thus multiplexed signal is converted into an analog base band signal 108 by a digital-analog converter 107. This code-division multiple base band signal is carrier modulated by a carrier modulator 109 against the carrier and is transmitted to a transmission path 110.

While, in a receiver, a reception signal 201 which is base band demodulated from the intermediate frequency signal in a converter 200 is firstly quantized to the digital signal by an analog/digital converter 202 as shown in FIG. 11A.

This quantized data is returned to the linear code-division multiplexed value by the non-linear calculator 106 in a modulator and a secondary non-linear calculator 203 having inverse map. If the non-linear map in a modulator has the characteristic described above as shown in FIG. 10B, the secondary non-linear calculator in a demodulator has the input/output characteristic as shown in FIG. 11B. It should be noted that a vertical line and a lateral line in FIG. 11B are graduated at the same rate.

When spread codes generated from a code generator 206 are correlatively calculated with thus code-division multiplexed data by digital correlators 205 (1 to n), the code-division multiple signal is spread inversely processed and is demodulated to low speed parallel data 207 (1 to n). Thus parallel data are finally converted to the high speed reception data by a parallel/serial converter 208. It should be noted that if the data is output as the parallel data, the converter 208 is not required.

FIG. 12A is a block diagram showing the structure of a reception unit of a code-division multiple communication apparatus in a ninth embodiment of the present invention. In FIG. 12A, the common structural devices as those in FIG. 11A and 11B are indicated by the same reference numerals. Although a transmission unit is same as that shown in FIG. 10A, a transmitter transmits the pilot signal which is spectrum spread by the single spread code as the preamble for a constant period immediately previous to the transmission of multiplexed information and transmits the signal which is compressed against the code-division multiple value by the non-linear map when the multiplexed information signal is transmitted. A demodulator firstly quantizes a base band signal 201 being a preamble by an analog/digital converter 202 and executes the cumulative adding calculation during the period corresponding to the code cycle by a cumulative adder 209 which serves as the integration means. An output of said cumulative adder 209 becomes zero when the preamble is depended on the single spread code and the spread code completely has the equilibrate characteristic. However, in case where the DC component is appeared in a transmission system and the off-set is observed in the analog/digital conversion value, an output of said cumulative adder 209 does not become zero but has a certain value. The result obtained to divide thus value by the code cycle becomes the DC component value in this transmission system.

Therefore, a process circuit 209 holds the value of said DC component utilizing a latch circuit 210 which serves as the hold means matching with a timing for switching the preamble to the multiplexed information transmission and the off-set value can always be referred during the receiving of the multiplexed information signal.

Next, an operation during the receiving of the multiplexed information signal will be described. The reception signal as the information signal is similarly converted to the digital code-division multiplexed value by an analog/digital converter 202. Since this converted value is appeared as the value including the DC component of a transmission system, against this value, by subtracting the corresponded off-set in a transmission system being an output from a latch circuit by a subtracter 211, the corresponded off-set in a transmission system can be compensated.

In this way, the code-division multiplexed value of which off-set is compensated is correlatively demodulated by the replica of spread codes generated from a code generator 206 and a digital correlator 205 so that the information symbol for each channel is demodulated. Thus obtained parallel data 207 (1 to n) are obtained as the high-speed reception data by a parallel/serial converter 208.

The structural example of a demodulator depending on a digital circuit is described in said ninth embodiment, however, the present invention can also be similarly adopted to an analog demodulator.

FIG. 12B is a block diagram showing the structure of a reception apparatus in a tenth embodiment of the present invention. In a demodulator, the reception base band is firstly divided into two paths. The one of them is input to a low-pass filter 212 and the corresponded off-set of the transmission system is appeared as the voltage signal in its output by executing the integration process during the receiving of the preamble.

Therefore, a process circuit 209' holds this offset value utilizing a sample/hold circuit 213 matching with a timing for switching the preamble to the multiplexed information transmission and this off-set value can always be referred during the receiving of the multiplexed information signal.

Next, an analog subtracter 214 structured by an ope-amplifier and the like subtracts the corresponded voltage off-set in a base band signal in accordance with the outputs from another path of the reception base band signal and the sample/hold circuit 213. The amplitude of this subtracter output is expanded by an analog non-linear element having the similar characteristic as that of a non-linear calculator 203, and thus output is further correlatively demodulated by the replica of spread codes generated from a code generator 206 and a correlator 216 to demodulate the information symbol of each channel. Thus obtained parallel data 207 (1 to n) are output as the high-speed reception data by a parallel/serial converter 208.

In the above ninth and tenth embodiments, as examples, the description is given as to a digital and an analog demodulator respectively, however, a digital/analog mixed demodulator can be also adopted to the present invention.

As above, the description was Given based on the preferable embodiments, however, the present invention is not limited to the foregoing embodiments but many modifications and variations are possible within the spirit and scope of the appended claims of the invention.

What is claimed is:

1. A spread spectrum transmission apparatus comprising:
   generating means for generating a code-division multiple signal;
   conversion means for non-linearly converting the code-division multiple signal; and
   transmission means for transmitting a transmission signal corresponding to the code-division multiple signal converted by said conversion means,
   wherein said converting means converts the code-division multiple signal so that the transmission signal has a plurality of amplitude values.

2. An apparatus according to claim 1, wherein said generation means includes spreading means for spreading each of plural transmission signals with a different spreading code and add means for adding plural transmission signals spread by said spreading means.

3. An apparatus according to claim 1, wherein said conversion means non-linearly limits the amplitude.

4. An apparatus according to claim 1, wherein said conversion means converts the amplitude in accordance with a non-linear characteristic determined on the basis of a generating probability of a code-division multiple signal value.

5. An apparatus according to claim 1, wherein said conversion means comprises a digital conversion table having the non-linear characteristic.

6. A spread spectrum reception apparatus comprising:
   reception means for receiving a code-division multiple signal;
   conversion means for non-linearly converting an amplitude of the code-division multiple signal; and
   de-spreading means for de-spreading the code-division multiple signal converted by said conversion means.

7. An apparatus according to claim 6, wherein said conversion means non-linearly limits the amplitude.

8. An apparatus according to claim 6, wherein said conversion means non-linearly expands the amplitude.

9. An apparatus according to claim 6, wherein said conversion means converts said amplitude in accordance with a non-linear characteristic determined on the basis of a generating probability of a code-division multiple signal value.

10. An apparatus according to claim 6, wherein said conversion means converts the amplitude in accordance with a non-linear characteristic determined on the basis of a transmission path characteristic.

11. An apparatus according to claim 6, wherein said conversion means comprises integration means for integrating the code-division multiple signal and subtraction means for subtracting an output of said integration means from the code-division multiple signal.

12. An apparatus according to claim 11, wherein said integration means integrates the code-division multiple signal in a preamble period.

13. A spread spectrum reception apparatus comprising:
   reception means for receiving a code-division multiple signal;
   integration means for integrating the code-division multiple signal;
   subtraction means for subtracting an output of said integration means from the code-division multiple signal; and
   non-linear calculation means for non-linearly calculating an output of said subtraction means.

14. An apparatus according to claim 13, wherein said integration means integrates the code-division multiple signal in a preamble period.

15. An apparatus according to claim 13, further comprising de-spreading means for de-spreading an output of said non-linear calculation means.

16. A spread communication system comprising:
   a transmission apparatus having generation means for generating a code-division multiple signal, first conversion means for non-linearly converting an amplitude of the code-division multiple signal, and transmission means for transmitting the code-division multiple signal converted by said first conversion means; and
   a reception apparatus having means for receiving the transmitted code-division multiple signal, second conversion means for non-linearly converting an amplitude of the code-division multiple signal transmitted by said transmission means, and de-spreading means for de-spreading the code-division multiple signal converted by said second conversion means.

17. A spread spectrum transmission method comprising the steps of:
   generating a code-division multiple signal;
   non-linearly converting the code-division multiple signal; and transmitting a transmission signal corresponding to the code-division multiple signal converted in said conversion step, wherein the code-division multiple signal is converted in converting step so that the transmission signal transmitted in said transmission step has a plurality of amplitude values.

18. A method according to claim 17, wherein said generating step includes a step of spreading each of plural transmission signals with a different spreading code and a step of adding the plural transmission signals spread in said spreading step.

19. A method according to claim 17, wherein said conversion step non-linearly limits the amplitude.

20. A method according to claim 17, wherein said conversion step converts the amplitude in accordance with a non-linear characteristic determined on the basis of a generating probability of a code-division multiple signal value.

21. A method according to claim 17, wherein said conversion step converts by using a digital conversion table having a non-linear characteristic.

22. A spread spectrum reception method comprising the steps of:

receiving a code-division multiple signal;

non-linearly converting an amplitude of the code-division multiple signal; and de-spreading the code-division multiple signal converted in said conversion step.

23. A method according to claim 22, wherein said conversion step non-linearly limits the amplitude.

24. A method according to claim 22, wherein said conversion step non-linearly expands the amplitude.

25. A method according to claim 22, wherein said conversion step converts the amplitude in accordance with a non-linear characteristic determined on the basis of a generating probability of a code-division multiple signal value.

26. A method according to claim 22, wherein said conversion step converts the amplitude in accordance with a non-linear characteristic determined on the basis of a transmission path characteristic.

27. A method according to claim 22, wherein said conversion step includes a step of integrating the code-division multiple signal and a step of subtracting an integration result of said integrating step from the code-division multiple signal.

28. A method according to claim 27, wherein said integrating step integrates the code-division multiple signal in a preamble period.

* * * * *

UNITED STATES PATENT AND TRADEMARK OFFICE
CERTIFICATE OF CORRECTION

PATENT NO. : 5,668,806
DATED      : September 16, 1997
INVENTOR(S) : YASUYUKI ARAI, ET AL.

It is certified that error appears in the above-identified patent and that said Letters Patent is hereby corrected as shown below:

COLUMN 1

Line 28, "an" should be deleted; and
    Line 56, "mintaturization" should read --miniaturization--.

COLUMN 2

Line 57, "Originally" should read --originally--; and
    Line 59, "t4" should read --14--.

COLUMN 6

Line 45, "thus" should read --this--.

COLUMN 7

Line 38, "Given" should read --given--.

Signed and Sealed this

Twenty-fourth Day of February, 1998

Attest:

BRUCE LEHMAN

Attesting Officer     Commissioner of Patents and Trademarks